United States Patent [19]

Jacobs

[11] Patent Number: 4,770,796

[45] Date of Patent: Sep. 13, 1988

[54] ENCAPSULATED BREAKER FOR CROSS-LINKED ACID GEL, FRACTURE ACIDIZING FLUID CONTAINING SAME AND METHOD OF USE THEREOF

[75] Inventor: Irwin C. Jacobs, Eureka, Mo.

[73] Assignee: Petrolite Corporation, St. Louis, Mo.

[21] Appl. No.: 2,315

[22] Filed: Jan. 12, 1987

[51] Int. Cl.$^4$ ............................................. E21B 43/27
[52] U.S. Cl. .................................. 252/8.553; 166/307; 252/8.551
[58] Field of Search .......................... 252/8.551, 8.553; 166/307; 428/402.24

[56] References Cited

U.S. PATENT DOCUMENTS

| | | | |
|---|---|---|---|
| 3,531,409 | 9/1970 | Seffens et al. | 252/8.555 |
| 3,898,165 | 8/1975 | Ely et al. | 252/8.551 |
| 4,172,055 | 10/1979 | DeMartino | 252/8.553 X |
| 4,324,668 | 8/1982 | Harris | 252/8.553 |
| 4,369,124 | 1/1983 | Elphingstone et al. | 252/8.553 X |
| 4,506,734 | 3/1985 | Nolte | 166/308 |
| 4,552,675 | 11/1985 | Brown et al. | 166/307 X |
| 4,604,218 | 8/1986 | Dawson | 252/8.553 |
| 4,624,795 | 11/1986 | Dawson et al. | 252/8.553 |

*Primary Examiner*—Herbert B. Guynn
*Attorney, Agent, or Firm*—Robert E. Wexler

[57] ABSTRACT

Fracture acidizing fluids are provided containing an encapsulated breaker which releases breaker at a regulated rate over time.

15 Claims, No Drawings

ENCAPSULATED BREAKER FOR CROSS-LINKED ACID GEL, FRACTURE ACIDIZING FLUID CONTAINING SAME AND METHOD OF USE THEREOF

BACKGROUND OF THE INVENTION

1. Field of the Invention

This invention relates to cross-linked acid gels useful as fracture acidizing fluids and as workover and completion fluids for use in oil and gas wells in subterranean formations, to a novel encapsulated breaker for such fluids and a method of treating subterranean formations and wells using such cross-linked fluids containing said novel breaker.

The art of well stimulation commonly employs a technique called fracture-acidizing to enhance the recovery of either oil or gas from subterranean formations. Normally, fracture-acidizing involves the injection of an aqueous acid, which may or may not contain a proppant material, into a well bore at such a rate and pressure as to exceed the formation stresses, thereby causing rock fatigue and inducing new fractures in the formation. Fractures are natural or induced cracks or channels in the formation matrix. Stimulation by this technique is achieved by allowing the acid to etch the fracture face. Since the face is a heterogeneous composition, the acid reaction rates will vary on the exposed surface. After the exerted injection pressure has been relieved, fracture closure will occur but the fracture face is no longer uniform and in most cases will not perfectly realign due to the etching action of the acid. If a proppant is pumped with the acid, areas not etched by the acid will be "propped" open by the proppant material.

In each case, a more conductive channel is provided to allow the oil or gas to flow to the well bore after the injection pressure is relieved. When an aqueous acid is injected into a well bore in a fracture-acidizing application, it is often advantageous to use a viscosifying or gelling agent in the fluid. Viscous fluids possess several properties which are favorable to fracture acidizing. For example, the fluid viscosity is proportionally related to the created fracture volume and fracture width. Higher fluid viscosities, therefore, will generate larger fracture volumes and fracture widths. In addition, viscous fluids decrease the rate at which acid is exposed to the formation, allowing the acid to penetrate more deeply into the fracture before it is spent. Viscous fluids further serve as efficient proppant transporting media necessary to place a proppant into the etched fracture.

2. Prior Art

Various materials are known to act as viscosifying or gelling agents for fracture acidizing fluids. For example, guar gum, hydroxypropyl guar, hydroxethyl cellulose, carboxylmethylhydroxyethyl cellulose, xantham gum and acid stable polymers and copolymer compositions have been used.

Normally, an acid such as hydrochloric, hydrofluoric, formic, acetic and mono-, di- and tri-chloroacetic acids are used in these compositions. The aqueous acid, in a strength of from about 3% to about 28% or more by weight of the total fracture acidizing fluid, is added to the gelling agent and the composition is pumped down hole. Unfortunately, many of the gelled fracture acidizing fluids are not stable at the conditions encountered down hole, wherein temperatures of 50° C. to 90° C. and higher are encountered, combined with the strongly acid conditions inherent in the system. Because of the strongly acid, high temperature conditions, many of the gelled fracture acidizing fluids break down, lose their viscosity and completely release the acid before the fluid has been pumped through the formation.

Recently, cross-linked acidizing polymer gels have found increasing acceptance as viscosifying/gelling agents because of their greater ability to maintain their viscosity under down hole conditions and decrease the reaction rate of the acid with the formation.

The acid systems containing cross-linked polymers must have the characteristic, common with most acid systems gelled with natural and synthetic polymers, of eventually breaking down after most of the acid has been spent so that the fluid may be pumped out of the formation.

It is known that cross-linked gelled acid fracture acidizing fluids, wherein a polymer is cross-linked with titanium or zirconium compounds, are sensitive to fluoride, phosphate or sulphate anions. The fluoride, phosphate or sulphate anions coordinate with the titanium or zirconium cross-linking agent and renders it incapable of coordination with groups along the polymer chain, thereby affecting a reversion of the polymer to the non-cross linked state. Such reversion immediately lowers the viscosity of the acid gel system, releasing the acid and rendering the fluid capable of being pumped out of the formation and/or well and back to the surface.

U.S. Pat. No. 4,604,218 describes a cross-linked gelled aqueous acid system for use in fracture acidizing wherein a copolymer of an alkyl allyl ammonium halide and a vinyl phosphoric acid is cross-linked with a titanium or zirconium compound. Control of the viscosity of the fracture-acidizing gel is obtained by incorporating in the system a gel degrading substance, e.g., a compound containing fluoride, phosphate or sulphate anions which, as described above, coordinates with the cross-linking agent and thereby "breaks" the viscosity of the gel so that it decreases to a low viscosity to allow return of the fluid to the well bore. It is stated that the rate of fluoride release can be better controlled by encapsulating the gel degrading substance with synthetic polymers or natural gums. There is no disclosure, however, of such an encapsulated breaker or of a system which contains an encapsulated fluoride, phosphate or sulphate anion which would accomplish the breakdown of the viscosity of the cross-linked aqueous acid system over time. As described in column 7 thereof, a cross-linked system containing a non-encapsulated gel degrading substance exhibited viscosity decline at the low temperature of only 23° C. over six (6) hours. Further, heat stability tests of the cross-linked system (col. 7) at 82° C. were conducted in the absence of a gel degrading substance and under static conditions and cannot be considered an indication of stability of a system incorporating a breaker under actual use conditions involving considerable shear stresses on the cross-linked system. In column 8 it is stated that the fluid viscosity of the cross-linked system can be reduced over a period of time by the presence of fluoride, phosphate or sulphate groups which eventually degrade the cross-linked structure so that the gelled system returns to a lower viscosity. There is no disclosure, however, of how one skilled in the art could accomplish such delayed degradation.

SUMMARY OF THE INVENTION

In accordance with the present invention, there is provided an encapsulated breaker for cross-linked aqueous acid-polymer gel compositions containing the same and a method for using such compositions in fracture acidizing.

DESCRIPTION OF THE PREFERRED EMBODIMENTS

In accordance with the embodiment of the present invention, there is provided a fracture acidizing composition comprising a polymer, an aqueous acid, a cross-linking agent for said polymer and an encapsulated breaker. The breaker disrupts the cross-links of the polymer over time, thereby effecting a decrease in viscosity of the composition. The decrease in viscosity of the composition is controlled by the concentration of the released breaker which, in turn, is a function of the thickness of the encapsulant coating, the ingredients thereof and the ratio of ingredients in said coating.

One embodiment of the invention comprises a composition comprising a polymer, a cross-linking agent for said polymer, an aqueous acid and a breaker compound capable of coordinating with titanium or zirconium cross-linking agents, said compound being encapsulated in a composition comprising a cellulosic material, a fatty acid and a wax.

In another embodiment of the invention there is provided a breaker composition comprising a compound capable of coordinating with titanium or zirconium cross-linking agents, said substance being encapsulated in a composition comprising a cellulosic material, a fatty acid and a wax.

ACIDS

The aqueous acids normally used in fracture acidizing systems are sulfuric acid, perchloric acid, nitric acid, phosphoric acid, acetic acid, hydrochloric acid, hydrofluoric acid, formic acid and mono-, di- and tri-chloroacetic acids in concentrations ranging from about 3% to about 28% or more by weight of the total fracture acidizing fluid.

POLYMERS

The polymers which, upon cross-linking, form the gel structure throughout which the aqueous acid is dispersed, may be any polymers which contain pendant groups capable of coordinating with compounds of zirconium or titanium, e.g., carboxylate, sulfonate and phosphate groups. Numerous examples of such polymers are known to those skilled in the art, e.g., acrylates, acrylamide/phosphonic acid copolymers, alkyl allyl ammonium halide/vinyl phosphoric acid copolymers, acrylamid/acrylate/acrylomidomethyl propane sulfonic acid terpolymers and the like.

According to an embodiment of the present invention, it has been found that an inverse emulsion copolymer of acrylamide and the sodium salt of acrylamidomethyl propane sulfonic acid (AMPS) has characteristics particularly suited for use in the method of the present invention. In particular, it has been found that a copolymer of from about 70 to about 90 mole percent acrylamide and, correspondingly, from about 30 to about 10 mole percent of the sodium salt of AMPS is suited for use in the method of the invention, especially a copolymer of about 75–80 mole percent acrylamide and, correspondingly, about 25–20 mole percent AMPS salt.

CROSS-LINKING AGENTS

The agents which are used to cross-link the polymers used in the present invention are compounds of titanium and zirconium. The compounds are usually the titanium or zirconium salts of organic acids, including mono- and poly-carboxylic organic acids containing at least two carbon atoms. Such acids may be saturated or unsaturated and include, for example, acetic acid, propionic acid, lactic acid, butyric acid, valeric acid, caproic acid, heptoic acid, caprylic acid, pelargonic acid, capric acid, lauric acid, acrylic acid, crotonic acid, oxalic acid, malonic acid, succinic acid, glutaric acid, adipic acid, pimelic acid, suberic acid, azelaic acid, sebacic acid, maleic acid, fumaric acid, citraconic acid, glutaconic acid, phenylacetic acid, hydroxyphenylacetic acid, alpha-hydroxypropionic acid, hydroxysuccinic acid, aminosuccinic acid, benzoic acid, methylbenzoic acid, citric acid and the like. The preferred cross-linking agents are zirconium acetate, titanium acetate, zirconium lactate and titanium lactate. Additionally, chromium salts of the acids described above are effective cross-linking agents for acrylate polymers.

The concentration of cross-linking agent, calculated as zirconium oxide or titanium oxide, should range from about 0.1% to about 10% by weight based on the weight of the polymer, especially from about 4% to about 7%. The cross-linking agent is added to the polymer as an aqueous dilute solution.

GEL BREAKER

The gel breaker substances used in the present invention are substances which have the ability to break the cross-linking bonds within the polymer by coordinating with the metal cross-linking agent and preventing it from being further capable of coordination with functional groups along the polymer chains. There are various substances which are known to have such ability. These substances include compounds containing fluoride, phosphate or sulphate anions and polycarboxylated compounds such as ethylene diamine tetraacetic acid or its ammonium, alkali or alkaline earth metal salts. Preferably, substances containing fluoride anions are used as breakers in the present invention, such substances including, for example, fluorspar, cryolite, fluorosilicates, fluoroborates and other naturally occurring minerals containing the fluoride anion in the crystalline structure. Phosphates and sulphates which may be used as breakers include the alkali and alkaline earth metal phosphates and sulphates.

The desired concentration of breaker used in the method of the present invention is within the range of from about 20–30 lbs. breaker per 1,000 gal. of total fluids (i.e., vol. acid plus vol. polymer solution), e.g., about 0.1% to about 1% based on volume of total fluids.

The average diameter of the particles of the encapsulated breaker is generally from about 30 to about 2,000 microns, preferably from about 100 to about 1,000 microns, especially from about 100 to about 500 microns.

ENCAPSULANT

The encapsulant composition used in the present invention must be such that it is not acid or water soluble or degradable, it must not melt below temperatures of about 90° C. and must allow the diffusion of fluoride anions therethrough. The breaker compound containing, for example, fluoride anion is disposed within and completely surrounded by the encapsulant material which is not completely impervious to water and acid. Accordingly, water and acid slowly diffuse through the encapsulant material coating, thereby contacting and dissolving the fluoride-containing breaker compound and releasing fluoride anion. The fluoride solution concentration within the capsule slowly becomes greater than the fluoride solution concentration outside the capsule and osmotic pressure transports the fluoride anion through the encapsulant, thus freeing it to coordinate with the cross-linking agents, disrupt the cross-links and "break" the gelled polymer.

The encapsulant composition of the present invention comprises a cellulosic material, a fatty acid and, optionally, a wax.

Cellulosic materials which are useful in preparing the encapsulant composition of the invention include ethyl cellulose and other oil soluble, water insoluble, cellulose ethers such as ethyl 2-hydroxyethyl cellulose, 2-cyanoethyl cellulose, 2-hydroxybutyl methyl cellulose and the like.

Fatty acids which are useful in preparing the encapsulant composition of the invention include fatty acids having from about 10 to about 26 carbon atoms, e.g., stearic acid, hydrogenated stearic acid, oleic acid, hydrogenated oleic acid, mixtures of stearic/oleic acids, mixtures of hydrogenated stearic/hydrogenated oleic acids, capric acid, undecylic acid, lauric acid, tridecylic acid, myristic acid, pentadecylic acid, palmitic acid, margaric acid, nondecylic acid, arachidic acid, hexaeicosanoic acid, decenoic acid, octadecenoic acid, linolinic acid and the like and mixtures thereof.

Waxes which are useful in preparing the encapsulant compositions of the invention include natural waxes such as beeswax, ricebran wax, jojoba wax, peat wax, candelila wax, carnauba wax, ouricury wax, montan wax and the like and synthetic waxes such as Fischer-Tropsch waxes, copolymers of ethylene, propylene, butadiene and acrylic acid having wax-like properties, substituted amide waxes, chemically modified waxes, e.g., oxidized, saponified and esterid waxes and polyethylene waxes such as POLYWAX® polyethylene waxes (Petrolite Corporation) having a molecular weight (number average) of from about 500 to about 2,000.

It has been found that the encapsulant composition of the invention must contain at least the cellulosic material and the fatty acid or it will not function properly to release fluoride ions at controlled rates. Inclusion of a wax is preferable, however, since it slows release by making the coating more hydrophobic. Thus, the materials themselves and their relative concentrations are critical to the proper operation of the encapsulant composition. For instance, the greater the concentration of wax and cellulosic in the composition, the slower is the release of the fluoride anion. Conversely, the greater the concentration of fatty acid, the greater is the release of the fluoride anion. Accordingly, the ratio of the cellulosic material, fatty acid and, optionally, wax may be regulated in order to control the amount of fluoride anion released over time into the gelled polymer. Additionally, the thickness of the encapsulant coating may be controlled to regulate anion release over time.

Various combinations of synthetic and natural polymers were investigated in order to arrive at the encapsulant composition of the present invention. It has been found, for example, that there are a number of synthetic and natural compounds which will not function effectively as an encapsulant material for the breakers of the present invention. Thus, materials which have been found unsuitable when used alone as encapsulant material in the present invention include cellulose esters such as cellulose acetate butyrate; waxes; polyethylene; acrylates; polyesters and polyamides. Combinations of materials which have been found unsuitable for use as encapsulants include waxes plus fatty acids; polyvinyl alcohol plus fatty acids; polyvinyl acetate plus waxes and fatty acids. Accordingly, the encapsulant composition must be carefully selected in order to provide a material which is amenable to processes used to encapsulate the breakers used in the present invention and to provide the proper barrier so that the release of the breaker material may be controlled. The encapsulant must not degrade, melt or fracture under use conditions and must contain the proper combination of materials to withstand the harsh environment to which it is subjected.

The breaker materials of the invention are encapsulated using either a melt based coating system or a solvent based coating system.

The melt based coating system comprises adding particles of the breaker material, for example, calcium fluoride, to a melted mixture of the cellulosic material, fatty acid and wax to form a slurry. The slurry is then poured onto a rotating disc which is contained in the large end of a tower. The centrifugal force of the spinning disc produces uniform spherical particles, consisting of a core of calcium fluoride particles or agglomerates thereof encapsulated in a melt coating, which solidify in the top of the tower as they are flung from the disc and fall to the collection chamber at the bottom of the tower. The average diameter of the caoted particles is from about 30 microns to about 2,000 microns, preferably from about 100 microns to about 1,000 microns, especially from about 100 microns to about 500 microns. Variables which control the size of the coated particles include the viscosity of the melt (which is effected by temperature and the nature of the melt components) and the speed of the disc rotation.

Alternatively, encapsulation can proceed via a solvent based method wherein, for example, the cellulosic, fatty acid and wax are dissolved in a volatile solvent and the calcium fluoride is suspended in the solution. The solution is then poured onto the rotating disc and, as warm air is passed over the disc, particles of calcium fluoride are agglomerated into spheres which are adhered to each other and coated by the encapsulant material.

The method of the invention involves preparing a solution of polymer (e.g., AMPS/acrylamide copolymer) in, for example, 15% aqueous HCl. As the solution is pumped into a well, the cross-linking agent and breaker are added and the mixture is pumped into the oil bearing formation. The breaker is formulated in such a manner that the fluoride ion is not released until the mixture is placed deeply into the formation or else the advantages of retardation of the acid reaction and reduced fluid leak-off (net deeper penetration of live acid) will not be afforded.

The following non-limiting examples illustrate a preferred embodiment of the invention and the best mode of practice thereof.

EXAMPLE 1

Preparation of Encapsulated Breaker

Stearic acid (45 kgm) was added to a vessel along with ethyl cellulose (7 kgm). The mixture was heated at low heat until melted and then heated to about 120° C. with agitation. POLYWAX 1,000 polyethylene wax (25 kgm) was added with stirring while maintaining the temperature at about 120° C. Fluorspar (140 kgm) was added with good agitation while maintaining the temperature. The slurry was poured onto a disc having a diameter of approximately 20 cm. rotating at 2,000 rpm in the large end of an enclosed tower. The product collected was in the form of uniform spherical particles consisting of a core of fluorspar particles encapsulated in the coating material. The average diameter of the coated particles was about 300 microns.

It is contemplated that other acids, cellulosic materials and waxes as described above may be used with correspondingly good results.

EXAMPLE 2

Preparation of Acid Polymer Mixture

Two percent by weight of an aqueous solution of inverse emulsion polymer (75 mol % acrylamid/25 mol % sodium AMPS) containing 30 percent by weight polymer was added to 500 ml. of 15% by weight aqeuous hydrochloric acid while stirring at ambient conditions. The mixture was allowed to stand for one hour.

EXAMPLE 3

To 500 ml of the mixture of Example 2, there was added 0.3% by vol. zirconium acetate and 0.25% weight to volume of the encapsulated breaker of Example 1. The mixture was stirred in a blender for 15 sec. then heated to 50° C.

The viscosity, as measured under shear by a Fann 35 A viscometer (using a B-II bob and rotating at 100 rpm), had an initial reading of 400 cps, increased to 560 cps over 15 min. and then decreased to 30 cps over the following 15 min.

Under static conditions, the viscosity would have decreased over a period of about 2–4 hours.

It is contemplated that other polymers and breakers as described above would behave in a corresponding manner.

While the illustrative embodiments of the invention have been described with particularity, it will be understood that various other modifications will be apparent to and can be readily made by those skilled in the art without departing from the spirit and scope of the invention. Accordingly, it is not intended that the scope of the claims appended hereto be limited to the examples and descriptions set forth herein but rather that the claims be construed as encompassing all the features of patentable novelty which reside in the present invention, including all features which would be treated as equivalents thereof by those skilled in the art to which the invention pertains.

What is claimed is:

1. Composition comprising a particulate gel breaker for a cross-linked polymer gel, said gel containing pendant groups coordinated with titanium or zirconium compounds and having dispersed throughout said gel, at a concentration of from about 3 percent to about 28 percent by weight of the composition, an aqueous acid solution, said breaker being capable of coordinating with said titanium and zirconium compounds and being disposed within an encapsulant material which is water and acid insoluble but incompletely impervious to water and acid, said encapsulant comprising an oil soluble, water insoluble cellulosic material and a fatty acid.

2. Composition of claim 1 wherein said breaker is selected from the group consisting of compounds containing fluoride, phosphate or sulphate anions and polycarboxylated compounds and the ammonium, alkali metal or alkaline earth metal salts thereof.

3. Composition of claim 1 wherein said breaker is a substance containing fluoride, phosphate or sulphate anions.

4. Composition of claim 3 wherein said substance is fluorspar.

5. Composition of claim 1 wherein said encapsulant comprises ethyl cellulose and stearic acid.

6. Composition of claim 5 which additionally contains a wax.

7. Composition of claim 1 wherein said encapsulated breaker has an average particle size diameter of from about 30 to about 2,000 microns.

8. Composition of claim 1 wherein said encapsulated breaker has an average particle size diameter of from about 100 to about 1,000 microns.

9. Composition of claim 6 wherein said wax is a polyethylene wax.

10. Composition comprising a polymer containing pendant groups capable of coordinating with a titanium or zirconium compound cross-linking agent, an aqueous acid at a concentration of from about 3 percent to about 28 percent by weight of the composition, a titanium or zirconium compound cross-linking agent for said polymer and a composition of claim 1.

11. Composition of claim 10 wherein said polymer is a copolymer of acrylamide and the sodium salt of acrylamidomethyl propane sulfonic acid.

12. Composition comprising a cross-linked polymer gel, said gel containing pendant groups coordinated with titanium or zirconium compounds and having dispersed throughout said gel, at a concentration of from about 3 percent to about 28 percent by weight of the composition, an aqueous acid solution, and the breaker composition of claim 1.

13. Composition of claim 12 wherein said polymer is a copolymer of acrylamide and the sodium salt of acrylamidomethyl propane sulfonic acid.

14. Composition comprising a titanium or zirconium compound cross-linking agent for a polymer containing pendant groups which are capable of coordinating with said cross-linking agent and the breaker composition of claim 1.

15. Method of treating a subterranean formation comprising injecting into said formation a polymer containing pendant groups capable of coordinating with titanium and zirconium compound cross-linking agents and which, upon cross-linking forms a gel structure, an aqueous acid, a titanium or zirconium compound cross-linking agent for said polymer and the breaker composition of claim 1.

* * * * *